G. KOHLHAAS.
TOOL HOLDER.
APPLICATION FILED JAN. 31, 1914.

1,185,106.

Patented May 30, 1916.
2 SHEETS—SHEET 1.

Attest:
Ewd L. Toleon,
C. E. Parsons

Inventor:
George Kohlhaas,
by Spear, Middleton, Donaldson & Spear,
Attys.

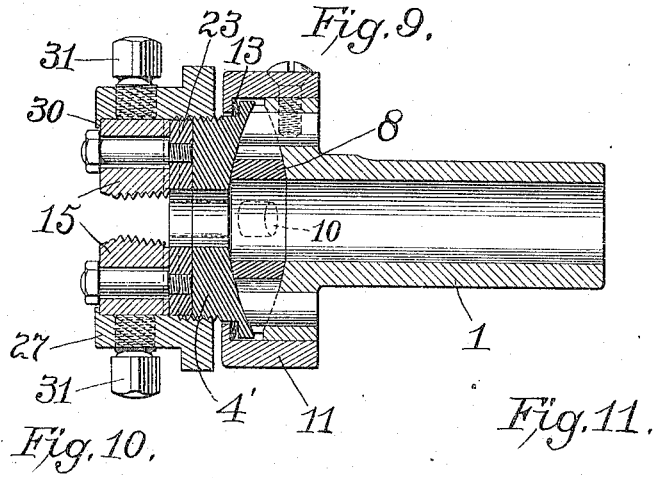

UNITED STATES PATENT OFFICE.

GEORGE KOHLHAAS, OF ELMIRA, NEW YORK.

TOOL-HOLDER.

1,185,106.  Specification of Letters Patent.  Patented May 30, 1916.

Application filed January 31, 1914. Serial No. 815,786.

*To all whom it may concern:*

Be it known that I, GEORGE KOHLHAAS, a citizen of the United States, residing at Elmira, New York, have invented certain new and useful Improvements in Tool-Holders, of which the following is a specification.

One object of my invention is to provide a tool which will be self compensating for irregularities or eccentricities in the work piece or in the driving spindle to which the tool is attached. It happens at times that the stock or work piece will have such irregularities as to cause it to perform a movement of an oscillatory character as it revolves, and this may be true also of the spindle and it is to take care of such conditions and to permit the dies to follow the stock that my invention has been devised in the main.

Other objects of my invention will hereinafter appear.

The invention consists in the features and combination and arrangement of parts hereinafter described and particularly pointed out in the claims.

Figure 1A:
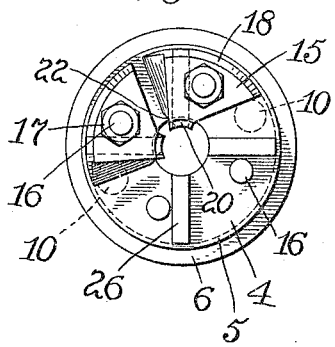
Figure 1:
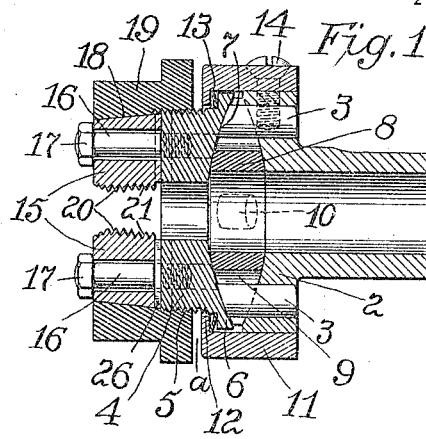
Figure 2:
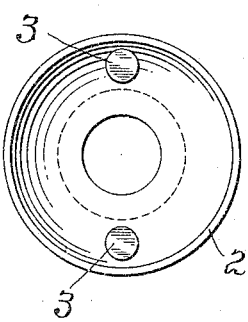
Figure 3:
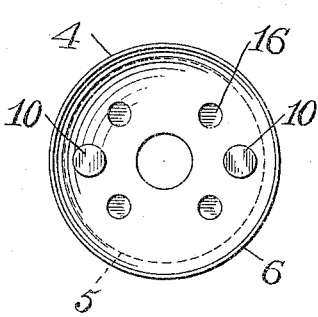
Figure 4:
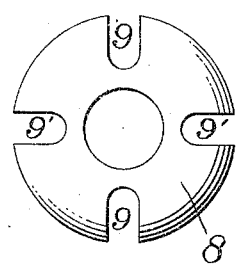
Figure 5:
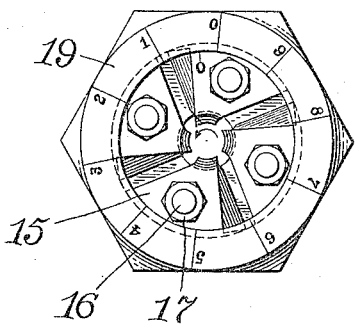
Figure 6:
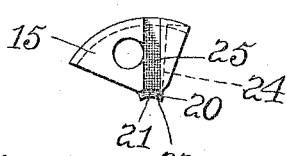
Figure 7:
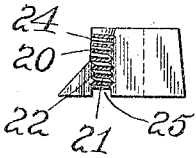
Figure 8:
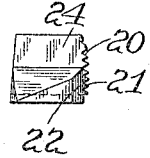

In the accompanying drawings:—Figure 1 is a sectional view through one form of tool embodying my invention. Fig. 1ª is a front view of the die holder with two of the dies in place. Fig. 2 is a front view of the shank member. Fig. 3 a view of the rear face of the die holder. Fig. 4 is a view of the compensating piece. Fig. 5 is a front view of the die holder with the dies in place. Fig. 6 is a rear view of one of the dies. Fig. 7 is a view of one of the die members looking from the inner side thereof. Fig. 8 is a view of the die of Fig. 7, looking from the left of Fig. 7. Fig. 9 is a view similar to Fig. 1 of another form of die members and their mounting. Fig. 10 is a front view of Fig. 9. Fig. 11 is a front view similar to Fig. 10 showing a button form of die. Fig. 12 is a view of the invention for driving a tapping die.

In these drawings 1 is the shank of the tool to be connected with the driving spindle in any suitable manner. This shank has a head or flange 2 provided with a concave face formed substantially like a segment of a sphere. Two pins 3 project from this face, said pins having end faces inclining radially outwardly and backwardly. In front of this shank the die carrying piece 4 is placed, this having a threaded portion 5, a flange 6 and a rear concaved face 7 which is also formed like a segment of a sphere or substantially so. Between these concave faces, of the shank and die carrier piece, a compensating member 8 is placed which has convex faces corresponding in curve or sphericity to the concave faces mentioned. It has radially disposed openings or slots 9, 9′ to receive the pins 3 of the shank member and also to receive the pins 10 projecting from the concave face of the die carrying piece. These pins 10, like the pins 3, are formed with inclined end faces. These two pairs of pins 3 and 10 are disposed at right angles to each other, the pins 3 engaging the slots 9 and the pins 10 engaging the slots 9′. The parts thus far described are held together by a hood 11 having a flange 12 reaching over the flange 6 of the die carrier with a spring member 13 interposed, this spring member being in the form of a conical metal ring, the base of the cone being seated against the rear face of the flange 12.

The hood is secured in position by the screw 14. The dies 15 are held to the die carrier by pins 16 passing through enlarged openings in the dies so that they may be adjusted. Nuts 17 hold the dies in adjusted position. For adjusting the dies accurately I form their exterior faces conical as at 18, and employ a gage ring 19 screw threaded onto the die carrier and having a conical interior to fit the conical surfaces of the dies. By loosening the nuts 17 the ring may be turned and set according to its graduations and in relation to the index mark O on one of the dies, and then by setting the dies out against the inner face of the gage ring and securing them in this position they can be set accurately to the proper gage. A space is left at *a* between the ring and hood to allow for the tipping or angular displacement of the die carrier in relation to the axis of the tool.

It will be noticed that by reason of the pin and slot connection between the spindle and die carrier and the compensating coupling piece, a relative lateral movement of the spindle shank and die carrier is permitted and this displacement will not only be laterally but angularly in respect to the axis of the spindle, and by the use of the yielding mounting of the die carrier obtained by the use of the conical spring the die carrier can have an angular or tipping movement individually.

It has been proposed heretofore to provide lateral compensating movement of the die carrier in relation to the spindle, this movement being at right angles to the axes of these parts or in one plane transverse to the said axes. This will not take care however, of conditions due to irregularities which would make the work piece and spindle assume an angular position in relation to each other. With my arrangement however, the compensating piece having the curved or spherical faces, together with the yielding mounting of the work piece, will compensate for lateral disalinement of the work piece and spindle and also for angular disalinement, that is to say in the latter case where the axis of the work piece stands at an angle to the axis of the spindle instead of being coincident therewith or parallel thereto. The spherical or curved face compensating piece will allow the die to assume a general position at an angle to the axis of the work piece or spindle or both and the spring will allow the die to straighten up into alinement axially with the work piece, and thus the die will follow the work piece or stock in its irregular movements should it have any.

Regarding the dies, these are provided with threads 20 which do the cutting and below these the threads 21 are slabbed off at 22 to present faces inclining backwardly in relation to the direction of revolution to prevent cutting, so that these threads 21 will simply act as guides following in the threads formed by the cutting threads 20 and thus the proper lead or movement of the stock and die relative to each die will be insured.

The dies are formed in sections and are individually removable so that they may be sharpened by grinding the face 24 or otherwise treated for keeping them in proper working order, all their parts being accessible when they are removed from their holders. The dies on their rear faces are provided with key ways or grooves 25 fitted to the keys or splines 26, seated in grooves of the die carrier. These keys extend radially and guide the dies in their adjustment toward and from the center of the tool.

Instead of mounting the dies on pins fixed to the die holding or carrying piece 4, I may, as shown in Fig. 9, mount the dies on a plate 23 by pins and nuts and guide them by radial grooves and keys in a manner similar to that described in connection with Fig. 1. In this case however, the dies are not tapered on their outer sides but are of cylindrical form and for holding them to the piece 4', and for driving and adjusting them I provide a ring 27 threaded onto the piece 4' and having a cylindrical interior to receive the dies and a flange 30 at its front end to hold the dies against the piece 4'. For adjusting these dies it is necessary to loosen their holding nuts, properly adjust the set or gage screws 31, which at their inner ends bear on the dies, and after the proper position of the dies has been attained the holding nuts are again tightened up. The set or gage screws are carried by the ring 27. This ring 27 will also permit a button die to be used, such as shown in Fig. 11, and in this instance the point of one of the set or gage screws reaches in the tapered opening 32 of the button die to rotate the same.

In Fig. 12 I show the compensating connection or coupling arranged between a spindle shank and a tapping die holder.

While I have described the invention in one embodiment thereof I do not limit myself to the precise arrangement shown, except as specifically defined in the appended claims.

I claim:

1. In combination with a tool spindle having a curved face, pins projecting from said face, a tool holder having an opposing curved rear face, pins thereon, and a spherically shaped coupling piece fitting in the recess formed by said curved faces and having slots therein engaging with the pins.

2. In combination with a tool spindle having a curved face, a tool holder having an opposing curved rear face, a spherically shaped coupling piece fitting in the space formed by said curved faces and a spring engaging directly with the holder so as to allow the holder to assume an angular position in relation to the other parts.

3. In combination a spindle shank, a tool holder, a hood connected with the shank and engaging the tool holder, a connection between the tool holder and spindle shank allowing the holder and shank to have relative lateral displacement and a spring interposed between the hood and holder to allow the holder to tip in relation to the hood, substantially as described.

4. In combination a spindle shank, a tool holder, a connection between the tool holder and shank allowing lateral displacement of one in relation to the other, a hood extending from the spindle shank having a flange extending in front of a part of a holder and a spring interposed between said flange and the holder to allow the latter to tip, substantially as described.

5. In combination a spindle shank, a tool holder, a coupling piece between them having spherical like faces fitted to corresponding faces of the tool holder and spindle, said coupling piece being slotted, pins on the spindle and holder engaging the slots to allow lateral and angular movement of the holder and spindle relative to each other, and a yielding mounting for the holder to allow it to tip individually in relation to the axis of the spindle, substantially as described.

6. In combination a spindle shank, a tool holder, a coupling piece between them having spherical like faces fitted to corresponding faces of the tool holder and spindle, said coupling piece being slotted, pins on the spindle and holder engaging the slots to allow lateral and angular movement of the holder and spindle relative to each other, and a yielding mounting for the holder to allow it to tip individually in relation to the axis of the spindle, said mounting including a hood extending from the spindle inclosing the coupling piece and having a flange reaching in front of a part of a holder and a spring between said flange and holder, substantially as described.

7. In combination a spindle, a tool holder and a spring mounting therefor comprising a hood extending from the tool holder having a flange lying in front of a part of the tool holder and a spring lying between said flange and the tool holder, said spring being in the form of a conical ring, substantially as described.

In testimony whereof I affix my signature in presence of two witnesses.

GEO. KOHLHAAS.

Witnesses:
 JOSEPH J. LUTZ,
 J. HUBERT BRAND.

Copies of this patent may be obtained for five cents each, by addressing the "Commissioner of Patents, Washington, D. C."